(12) United States Patent
Kim et al.

(10) Patent No.: US 12,722,988 B2
(45) Date of Patent: Sep. 1, 2026

(54) ULTRAVIOLET DISINFECTION DEVICE AND METHOD

(71) Applicant: KOREA WATER PARTNERSHIP, Seoul (KR)

(72) Inventors: Hyun Chul Kim, Seoul (KR); Ho Don Ryu, Cincinnati, OH (US); Seok Jong Byun, Naju-si (KR)

(73) Assignee: KOREA WATER PARTNERSHIP, Seoul (KR)

( * ) Notice: Subject to any disclaimer, the term of this patent is extended or adjusted under 35 U.S.C. 154(b) by 495 days.

(21) Appl. No.: 18/275,687

(22) PCT Filed: Jan. 27, 2022

(86) PCT No.: PCT/KR2022/001486

§ 371 (c)(1),
(2) Date: Sep. 14, 2023

(87) PCT Pub. No.: WO2022/169203

PCT Pub. Date: Aug. 11, 2022

(65) Prior Publication Data

US 2024/0109794 A1 Apr. 4, 2024

(30) Foreign Application Priority Data

Feb. 4, 2021 (KR) ........................ 10-2021-0015969
Oct. 14, 2021 (KR) ........................ 10-2021-0136874

(51) Int. Cl.
*C02F 1/32* (2023.01)

(52) U.S. Cl.
CPC ...................................... *C02F 1/32* (2013.01)

(58) Field of Classification Search
CPC ........ C02F 1/32; C02F 1/325; C02F 2201/32; C02F 2201/322; C02F 2201/3227;
(Continued)

(56) References Cited

U.S. PATENT DOCUMENTS

2012/0298592 A1* 11/2012 Boal ......................... C02F 1/32
210/103

FOREIGN PATENT DOCUMENTS

JP 2014-516776 A 7/2014
JP 2014-233646 A 12/2014
(Continued)

OTHER PUBLICATIONS

KR200277030Y1—EPO Machine Translation (Year: 2026).*
JP2020044515A—EPO Machine Translation (Year: 2026).*

*Primary Examiner* — Patrick Orme
(74) *Attorney, Agent, or Firm* — Bridgeway IP Law Group, PLLC; Jihun Kim

(57) ABSTRACT

Embodiments relate to an ultraviolet light-based disinfection device and method. The ultraviolet disinfection device, according to one embodiment, may disinfect a fluid on the basis of ultraviolet light, without injecting a drug or using a harmful material such as mercury. The device comprises a fluid supply unit, a flow sensing unit, a power unit, first and second reaction units, and first and second light source units emitting ultraviolet light of 265±5 nm and 278±7 nm wavelengths, respectively. The reaction units are configured to maximize contact between the fluid and ultraviolet light while preventing wavelength interference and improving disinfection efficiency.

7 Claims, 15 Drawing Sheets

(58) Field of Classification Search
CPC ........ C02F 2201/3228; C02F 2201/326; C02F 2209/40; C02F 2303/04
See application file for complete search history.

(56) References Cited

FOREIGN PATENT DOCUMENTS

| | | | | |
|---|---|---|---|---|
| JP | 2020044515 | A | * | 3/2020 |
| KR | 200277030 | Y1 | * | 5/2002 |
| KR | 10-0874130 | B1 | | 12/2008 |
| KR | 10-2015-0015880 | A | | 2/2015 |
| KR | 10-2015-0028190 | A | | 3/2015 |
| KR | 10-1583562 | B1 | | 1/2016 |
| KR | 10-2016-0018915 | A | | 2/2016 |
| KR | 10-2017-0028472 | A | | 3/2017 |
| KR | 10-1890361 | B1 | | 8/2018 |

* cited by examiner

ULTRAVIOLET DISINFECTION DEVICE AND METHOD

TECHNICAL FIELD

The present invention relates to a fluid disinfection technology, more specifically to an ultraviolet light-based disinfection device and method.

BACKGROUND ART

A necessity for a decentralized independent water management facility has been recently emphasized because of irregularity of rainfall frequencies and localization of rainfalls occurring by abnormal climate. In specific, tries for developing disinfection technologies and putting them to practical use have been made so as to solve a drinking water problem in rural areas where it is hard to supply safe water by a facility manager, such as island areas, coastal area, mountainous areas, and the like.

Generally, various disinfection methods using chlorine, ozone, ultraviolet, and the like are adopted to disinfect a fluid, but since such methods are performed together with the use of chemicals, by-products may be generated during the disinfection. Further, disinfection devices require relatively high maintenance costs, thereby making it realistically hard to be adopted in water supply facilities for responding natural phenomena or disasters.

Further, filtering technologies, which are used for small-scale water supply facilities or house water purifiers, block microorganisms according to pore sizes of membranes applied, thereby obtaining disinfection effectiveness. However, biofilms may be formed on the surfaces of the membranes, and in this case, it is difficult to remove the biofilms only through the filtering technologies, thereby requiring additional disinfection means.

The background art of the present invention is disclosed in Korean Patent Application Laid-open No. 10-2017-0028472.

DISCLOSURE

Technical Problem

Accordingly, it is an object of the present invention to provide an ultraviolet disinfection device and method that is capable of disinfecting a fluid through ultraviolet light, without injecting chemicals or using a harmful material such as mercury.

It is another object of the present invention to provide an ultraviolet disinfection device and method that is capable of disinfecting underground water or rainwater through ultraviolet light, thereby using the disinfected water as an alternative water resource in disaster situations and island and mountainous areas.

It is yet another object of the present invention to provide an ultraviolet disinfection device and method that is capable of improving biological stability of non-drinking water such as water for swimming waterscape facilities, water discharged lastly from public sewage treatment facilities, and the like.

It is still another object of the present invention to provide an ultraviolet disinfection device and method that is capable of preventing infection from occurring through inactivation of viruses contained in the indoor air of high risk facilities where respiratory infection diseases (e.g., Corona 19) may occur clusterly.

It is yet still another object of the present invention to provide an ultraviolet disinfection device and method that is capable of making use of an ultraviolet chamber to prevent a user's body from being exposed to light sources or ultraviolet light irradiated from the light sources, thereby providing safe environments during the use.

The technical problems to be achieved through the present invention are not limited as mentioned above, and other technical problems not mentioned herein will be obviously understood by one of ordinary skill in the art through the following description.

Technical Solution

According to one aspect of the present invention, an ultraviolet disinfection device may be provided.

According to the present invention, the ultraviolet disinfection device may include: a fluid supply unit for supplying a fluid introduced therein; a fluid flow sensing unit for sensing the flow of the fluid; a power unit for supplying power if a fluid flow signal is received from the fluid flow sensing unit; a first reaction unit adapted to introduce the fluid received from the fluid supply unit through a fluid inlet formed on underside of one side thereof and to discharge the fluid through a fluid outlet formed on top of the other side thereof; and a first light source unit disposed on the other side of the first reaction unit and adapted to receive the power from the power unit and thus irradiate ultraviolet light onto the fluid moving along the first reaction unit.

According to another aspect of the present invention, an ultraviolet disinfection method may be provided.

According to the present invention, the ultraviolet disinfection method may include the steps of: supplying a fluid introduced through a water supply pipe; sensing the flow of the fluid; supplying power if the flow of the fluid is sensed; receiving the power to irradiate first ultraviolet light onto the fluid flowing; and receiving the power to irradiate second ultraviolet light onto the fluid flowing.

Advantageous Effectiveness

According to the present invention, the ultraviolet disinfection device can disinfect the fluid through the ultraviolet light, without injecting chemicals or using a harmful material such as mercury.

According to the present invention, further, the ultraviolet disinfection device can disinfect underground water or rainwater through the ultraviolet light, thereby using the disinfected water as an alternative water resource in disaster situations and island and mountainous areas.

According to the present invention, furthermore, the ultraviolet disinfection device can improve biological stability of non-drinking water such as water for swimming waterscape facilities, water discharged lastly from public sewage treatment facilities, and the like.

According to the present invention, moreover, the ultraviolet disinfection device can prevent infection from occurring through inactivation of viruses contained in the indoor air of high risk facilities where respiratory infection diseases (e.g., Corona 19) may occur clusterly.

According to the present invention, additionally, the ultraviolet disinfection device can make use of the ultraviolet chamber to prevent the user's body from being exposed to light sources or ultraviolet light irradiated from the light sources, thereby providing safe environments during the use.

The effectiveness of the invention is not limited as mentioned above, and it should be understood to those skilled in the art that the effectiveness of the invention may include another effectiveness as not mentioned above from the detailed description of the present invention.

BEST MODE FOR INVENTION

The term 'connected (contacted or coupled)', as used herein, is defined as connected, although not necessarily directly, and not necessarily mechanically. To the contrarily, the term 'directly connected', as used herein, is defined as connected without having any component disposed therebetween. In the description, when it is said that one portion is described as "includes" any component, one element further may include other components unless no specific description is suggested.

Terms used in this application are used to only describe specific exemplary embodiments and are not intended to restrict the present invention. An expression referencing a singular value additionally refers to a corresponding expression of the plural number, unless explicitly limited otherwise by the context. In this application, terms, such as "comprise", "include", or 'have", are intended to designate those characteristics, numbers, steps, operations, elements, or parts which are described in the specification, or any combination of them that exist, and it should be understood that they do not preclude the possibility of the existence or possible addition of one or more additional characteristics, numbers, steps, operations, elements, or parts, or combinations thereof.

Figure 1:
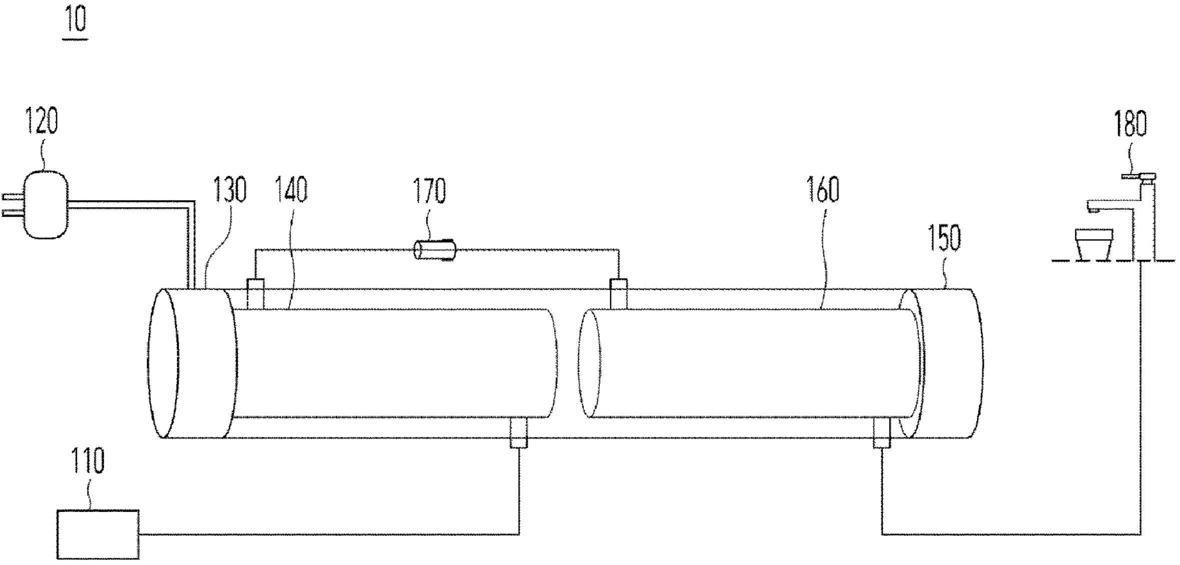
FIG. 1 is a perspective view showing an ultraviolet disinfection device according to a first embodiment of the present invention.

FIG. 1 is a perspective view showing an ultraviolet disinfection device according to a first embodiment of the present invention.

Referring to FIG. 1, an ultraviolet disinfection device according to a first embodiment of the present invention includes a fluid supply unit 110, a power unit 120, a first light source unit 130, a first reaction unit 140, a second light source unit 150, a second reaction unit 160, and a fluid flow sensing unit 170.

The fluid supply unit 110 serves to supply to the first reaction unit 140 a fluid introduced from a water supply pipe for public water, a storage tank for indoor or outdoor water, etc.

If the power unit 120 receives a fluid flow signal from the fluid flow sensing unit 170, it serves to supply power to the first light source unit 130 or the second light source unit 150 according to preset signal values. Even if the power unit 120 does not receive the fluid flow signal from the fluid flow sensing unit 170 after a predetermined time has passed from the last time when the power unit 120 receives the fluid flow signal from the fluid flow sensing unit 170, the power unit 120 supplies power to the first light source unit 130 or the second light source unit 150 according to the preset signal values and thus allows the fluid forcedly remaining in the first reaction unit 140 and the second reaction unit 160 to be disinfected during the use of the ultraviolet disinfection device.

The first light source unit 130 is disposed on one side of a cylindrical housing and has the shape of a cylinder with the same diameter as the housing in such a way as to be coupled to the housing. The first light source unit 130 receives the power from the power unit 120 according to the fluid flow signal sensed through the fluid flow sensing unit 170 and thus irradiates first ultraviolet light. In this case, the first ultraviolet light has the wavelength of 260 to 270 nm. In specific, the first light source unit 130 is disposed on the other side of the first reaction unit 140 and irradiates the first ultraviolet light onto the fluid introduced into the first reaction unit 140 through the fluid supply unit 110. If the first light source unit 130 makes use of ultraviolet light with the wavelength less than or equal to 230 nm, most of the ultraviolet light is absorbed to water, which is not adequate for disinfection of drinking water. Therefore, the first light source unit 130 irradiates the ultraviolet light having a maximum wavelength peak of 265±5 nm.

The first reaction unit 140 has the shape of a cylinder disposed in the housing and is coupled to the other side of the first light source unit 130. The first reaction unit 140 has a fluid inlet protruding from the underside of one side thereof to allow the fluid introduced through the fluid inlet to be exposed to the ultraviolet light and thus react to the ultraviolet light. Further, the first reaction unit 140 has a fluid outlet protruding from top of the other side thereof in such a way as to move the fluid purified through the first ultraviolet light therealong. The fluid is introduced through the fluid inlet formed on the underside of one side of the first reaction unit 140 and then discharged through the fluid outlet formed on the top of the other side thereof. Accordingly, the first reaction unit 140 is configured to move the fluid toward the first light source unit 130, thereby improving the disinfection effectiveness of the fluid.

Further, an outer cover with a reflector coated on the inner peripheral surface thereof to reflect ultraviolet light is provided to surround the first reaction unit 140.

The second light source unit 150 is disposed on the other side of the cylindrical housing and has the shape of a cylinder with the same diameter as the housing in such a way as to be coupled to the housing. The second light source unit 150 receives the power from the power unit 120 according to the fluid flow signal sensed through the fluid flow sensing unit 170 and thus irradiates second ultraviolet light. In this case, the second ultraviolet light has the wavelength of 271 to 285 nm. In specific, the second light source unit 150 is disposed on one side of the second reaction unit 140 and irradiates the second ultraviolet light onto the fluid introduced into the second reaction unit 160 through the first reaction unit 140. In this case, the second light source unit 150 irradiates the ultraviolet light having a maximum wavelength peak of 278±7 nm.

The second reaction unit 160 has the shape of a cylinder disposed in the housing and is coupled to one side of the second light source unit 150. The second reaction unit 160 has a fluid inlet protruding from top of the other side thereof to allow the fluid introduced through the fluid inlet to be exposed to the ultraviolet light and thus react to the ultraviolet light. Further, the second reaction unit 160 has a fluid outlet protruding from underside of one side thereof in such a way as to move the fluid purified through the second ultraviolet light therealong. The fluid is introduced through the fluid inlet formed on the top of the other side of the second reaction unit 160 and then discharged through the fluid outlet formed on the underside of one side thereof. Accordingly, the second reaction unit 160 is configured to move the fluid toward the second light source unit 150, thereby improving the disinfection effectiveness of the fluid. The fluid inlets and the fluid outlets of the first reaction unit 140 and the second reaction unit 160 are provided to allow the fluid introduced through the fluid supply unit 110 to pass through the first reaction unit 140 and the second reaction unit 160 at a full water level and to be then discharged therethrough at the full water level. The purified fluid that is discharged through the fluid outlet of the second reaction unit 160 is supplied to a user through an opening and closing device 180 connected to a path of the fluid outlet.

The fluid flow sensing unit 170 is disposed on one side of a path connecting the first reaction unit 140 and the second reaction unit 160 to each other and thus senses the flow of the fluid. If the flow of the fluid is sensed, the fluid flow sensing unit 170 transmits the fluid flow signal to the power unit 120.

Figure 2:
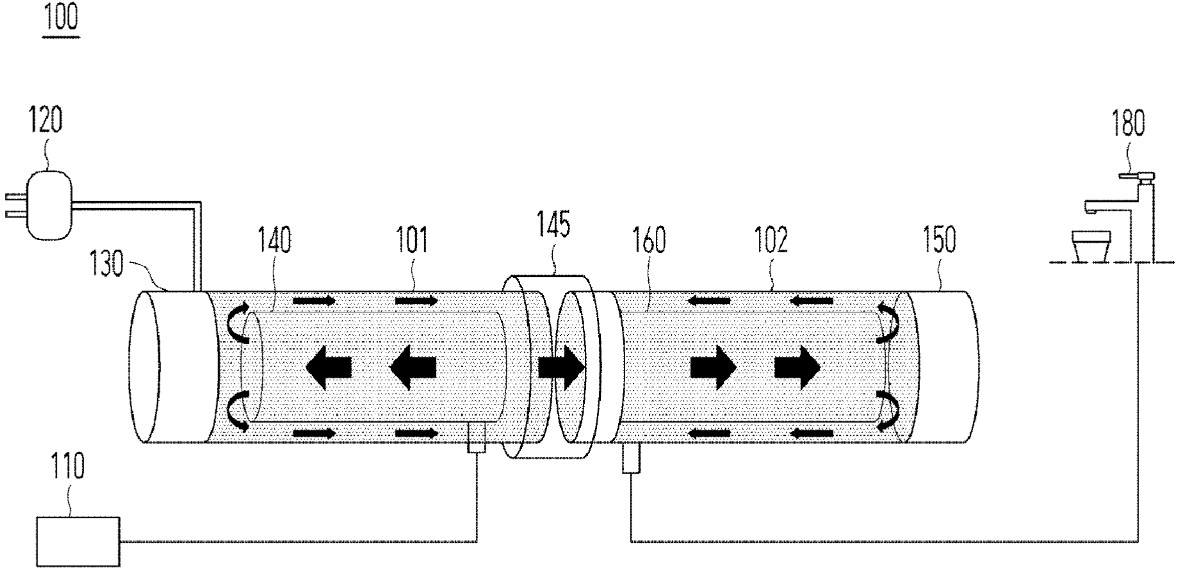
FIG. 2 is a perspective view showing an ultraviolet disinfection device according to a second embodiment of the present invention.

FIG. 2 is a perspective view showing an ultraviolet disinfection device according to a second embodiment of the present invention.

An ultraviolet disinfection device 10 according to a second embodiment of the present invention includes a cylindrical connector 145 adapted to connect two cylindrical housings to each other to allow the fluid discharged from a first reaction unit 140 to move to a second reaction unit 160.

In specific, the ultraviolet disinfection device 10 according to the second embodiment of the present invention includes a fluid supply unit 110, a power unit 120, a first light source unit 130, the first reaction unit 140, the connector 145, a second light source unit 150, and the second reaction unit 160.

In this case, the ultraviolet disinfection device 10 includes a fluid flow sensing unit disposed on one side of the first reaction unit 140 and/or the second reaction unit 160 to sense the flow of the fluid, and the power unit 120 serves to supply power to the first light source unit 130 or the second light source unit 150 according to preset signal values if the power unit 120 receives a fluid flow signal from the fluid flow sensing unit.

After a predetermined time has passed from the last time when the power unit 120 receives the fluid flow signal from the fluid flow sensing unit, the power unit 120 supplies power to the first light source unit 130 or the second light source unit 150 according to the preset signal values.

The first light source unit 130 is disposed on one side of a first cylindrical housing 101 and has the shape of a cylinder with the same diameter as the first housing 101 in such a way as to be coupled to the first housing 101. The first light source unit 130 receives the power from the power unit 120 and thus irradiates first ultraviolet light. In this case, the first ultraviolet light has the wavelength of 260 to 270 nm. In specific, the first light source unit 130 is disposed on the other side of the first reaction unit 140 and irradiates the first ultraviolet light onto the fluid introduced into the first reaction unit 140 through the fluid supply unit 110. If the first light source unit 130 makes use of ultraviolet light with the wavelength less than or equal to 230 nm, most of the ultraviolet light is absorbed to water, which is not adequate for disinfection of drinking water. Therefore, the first light source unit 130 irradiates the ultraviolet light having a maximum wavelength peak of 265±5 nm.

The first reaction unit 140 has the shape of a cylinder disposed in the first housing 101 and is open on one surface of the left side close to the first light source unit 130. The first reaction unit 140 has a fluid inlet protruding from the underside of one side thereof to allow the fluid introduced through the fluid inlet to be exposed to the ultraviolet light and thus react to the ultraviolet light.

In this case, the first reaction unit 140 introduces the fluid through the fluid inlet formed on the underside of one side thereof and then discharges the fluid through one surface of the left side close to the first light source unit 130. Accordingly, the first reaction unit 140 is configured to move the fluid toward the first light source unit 130, so that an effective staying time during which the ultraviolet light and microorganisms in the fluid react to each other is maximized on the surface of the first light source unit 130, thereby improving the disinfection effectiveness of the fluid.

Further, an outer cover with a reflector coated on the inner peripheral surface thereof to reflect ultraviolet light is provided to surround the first reaction unit 140.

The connector 145 has the shape of a cylinder coupled between the first housing 101 and a second housing 102 to allow the fluid discharged from the first reaction unit 140 to move to the second reaction unit 160.

The second light source unit 150 is disposed on the other side of the second cylindrical housing 102 and has the shape of a cylinder with the same diameter as the second housing 102 in such a way as to be coupled to the second housing 102. The second light source unit 150 receives the power from the power unit 120 and thus irradiates second ultraviolet light. In this case, the second ultraviolet light has the wavelength of 271 to 285 nm. In specific, the second light source unit 150 irradiates the second ultraviolet light onto the fluid introduced into the second reaction unit 160 through the connector 145. In this case, the second light source unit 150 irradiates the ultraviolet light having a maximum wavelength peak of 278±7 nm.

The second reaction unit 160 has the shape of a cylinder disposed in the second housing 102, is coupled to the connector 145, and is open on one surface of the right side close to the second light source unit 150. In this case, the second reaction unit 160 introduces the fluid through the connector 145 and then discharges the fluid through one surface of the right side close to the second light source unit 150. Accordingly, the second reaction unit 160 is configured to move the fluid toward the second light source unit 150, so that an effective staying time during which the ultraviolet light and microorganisms in the fluid react to each other is maximized on the surface of the second light source unit 150, thereby improving the disinfection effectiveness of the fluid.

The second housing 102 has a fluid outlet protruding from the underside of one side thereof to move the fluid purified through the second ultraviolet light therealong. The purified fluid that is discharged through the fluid outlet of the second housing 102 is supplied to a user through an opening and closing device 180 connected to a path of the fluid outlet.

FIGS. 3 to 7 are views showing the reaction units of the ultraviolet disinfection device according to the first and second embodiments of the present invention.

Figure 3:
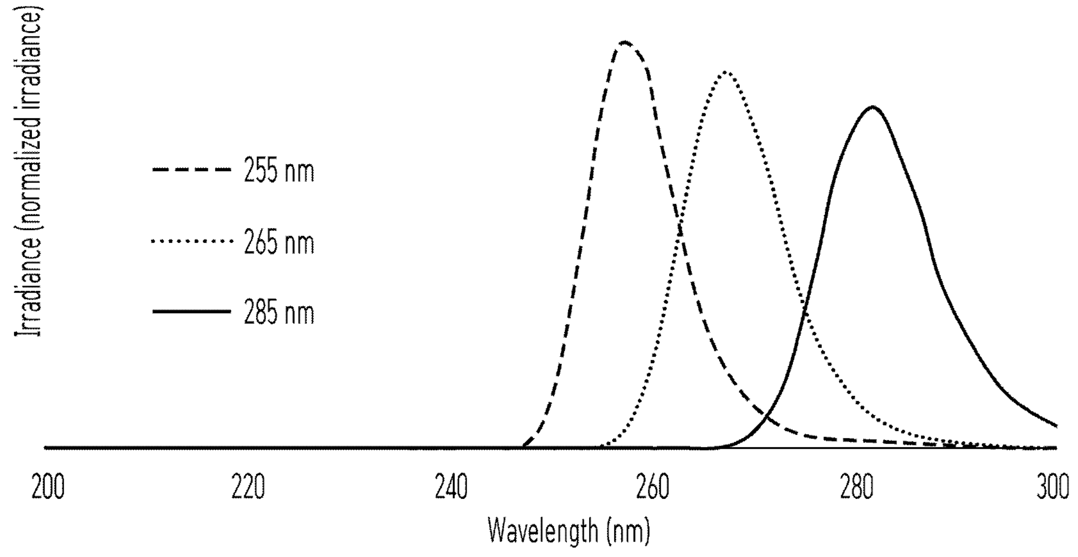
FIGS. 3 to 7 are views showing reaction units of the ultraviolet disinfection device according to the first and second embodiments of the present invention.

Referring to FIG. 3, if a plurality of light sources having different wavelengths are used, overlapping of different wavelengths may cause interferences such as disinfection performance degradation, energy loss, and the like. The ultraviolet disinfection device 10 according to the first embodiment of the present invention is configured to allow a reaction space to be separated into the first reaction unit 140 and the second reaction unit 160 according to the wavelengths of the ultraviolet light, so that the interference effect is pre-blocked to improve disinfection performance.

Figure 4:
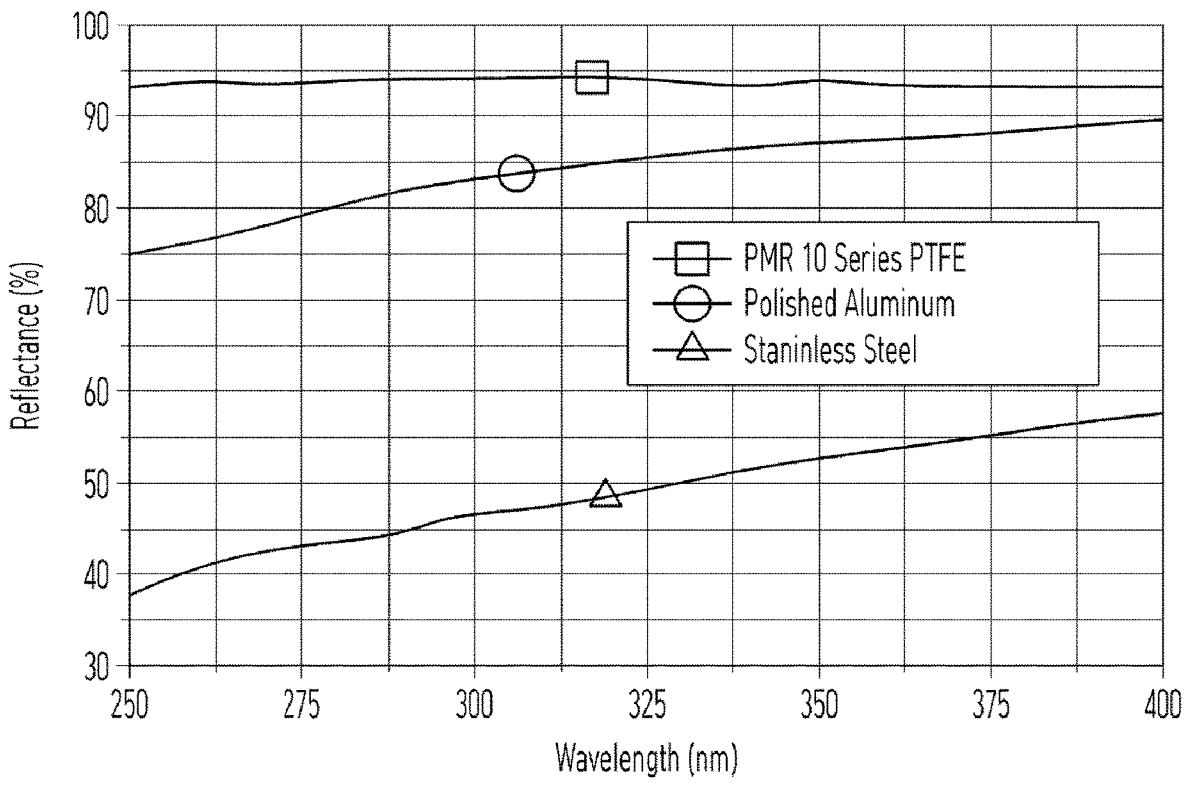

Referring to FIG. 4, the first reaction unit 140 and the second reaction unit 160 make use of the reflectors adapted to prevent the light energy generated through the light source units from being absorbed and consumed on the surfaces thereof. For example, the reflectors of the first reaction unit 140 and the second reaction unit 160 are made of a reflective material such as polytetrafluoroethylene (PTFE) or aluminum.

Figure 5:
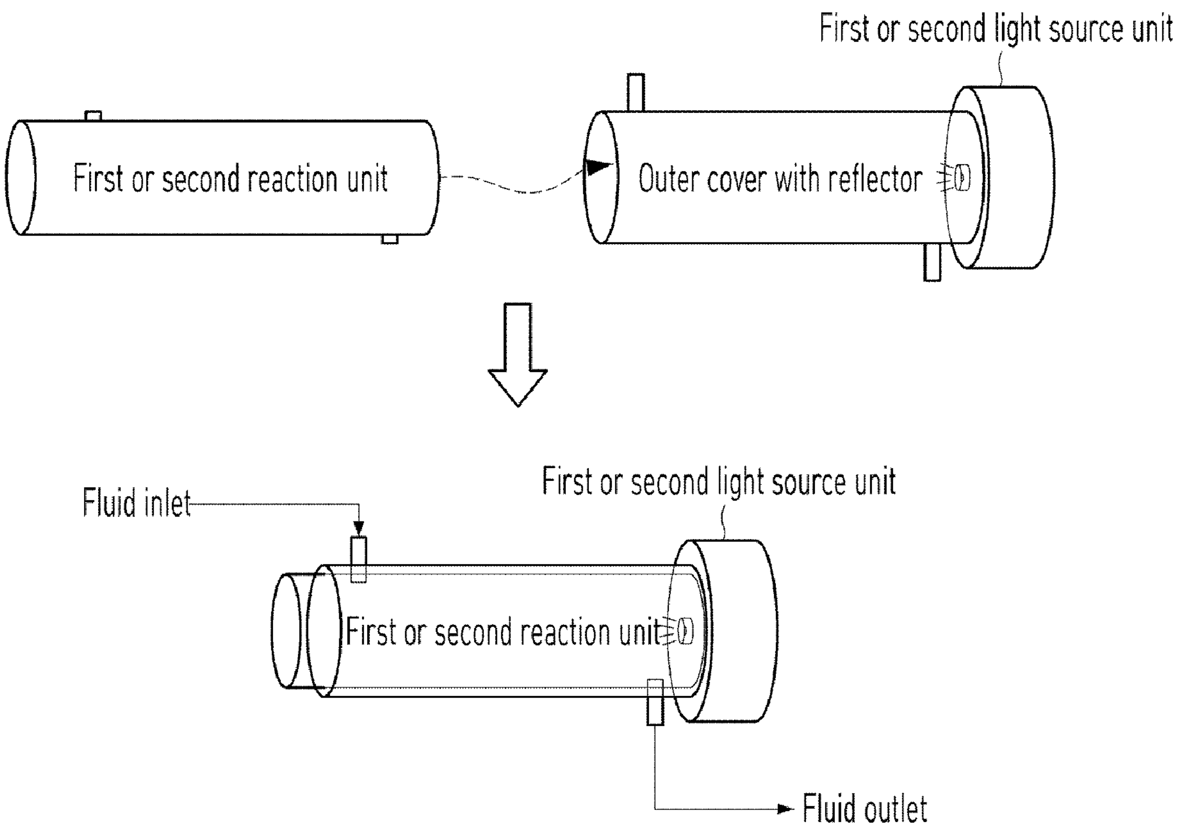
Figure 6:
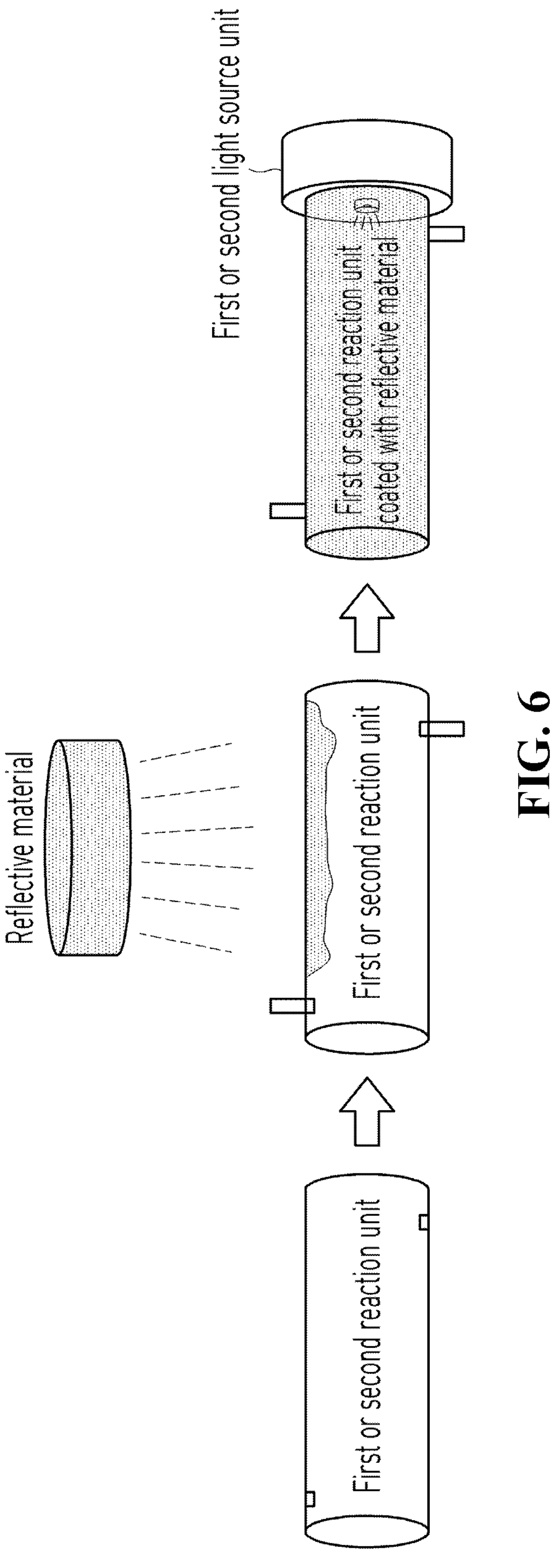

Referring to FIG. 5, the first reaction unit 140 or the second reaction unit 160 has the outer cover made of the reflector and the inner peripheral wall made of a light transmitting material through which the ultraviolet light received from the light source unit is not limited in movement between the reflector and the fluid. As shown in FIG. 6, otherwise, the outer peripheral wall of the first reaction unit 140 or the second reaction unit 160 is coated with a reflective material. According to another embodiment of the present invention, the first reaction unit 140 has the outer cover made of the reflector and the inner peripheral wall made of a light transmitting material through which the ultraviolet light received from the light source unit is not limited in movement between the reflector and the fluid, and the outer peripheral wall of the second reaction unit 160 is coated with a reflective material, so that the ultraviolet light irradiated from the first light source unit 130 is not irradiated onto the second reaction unit 160, and vice versa.

Figure 7:
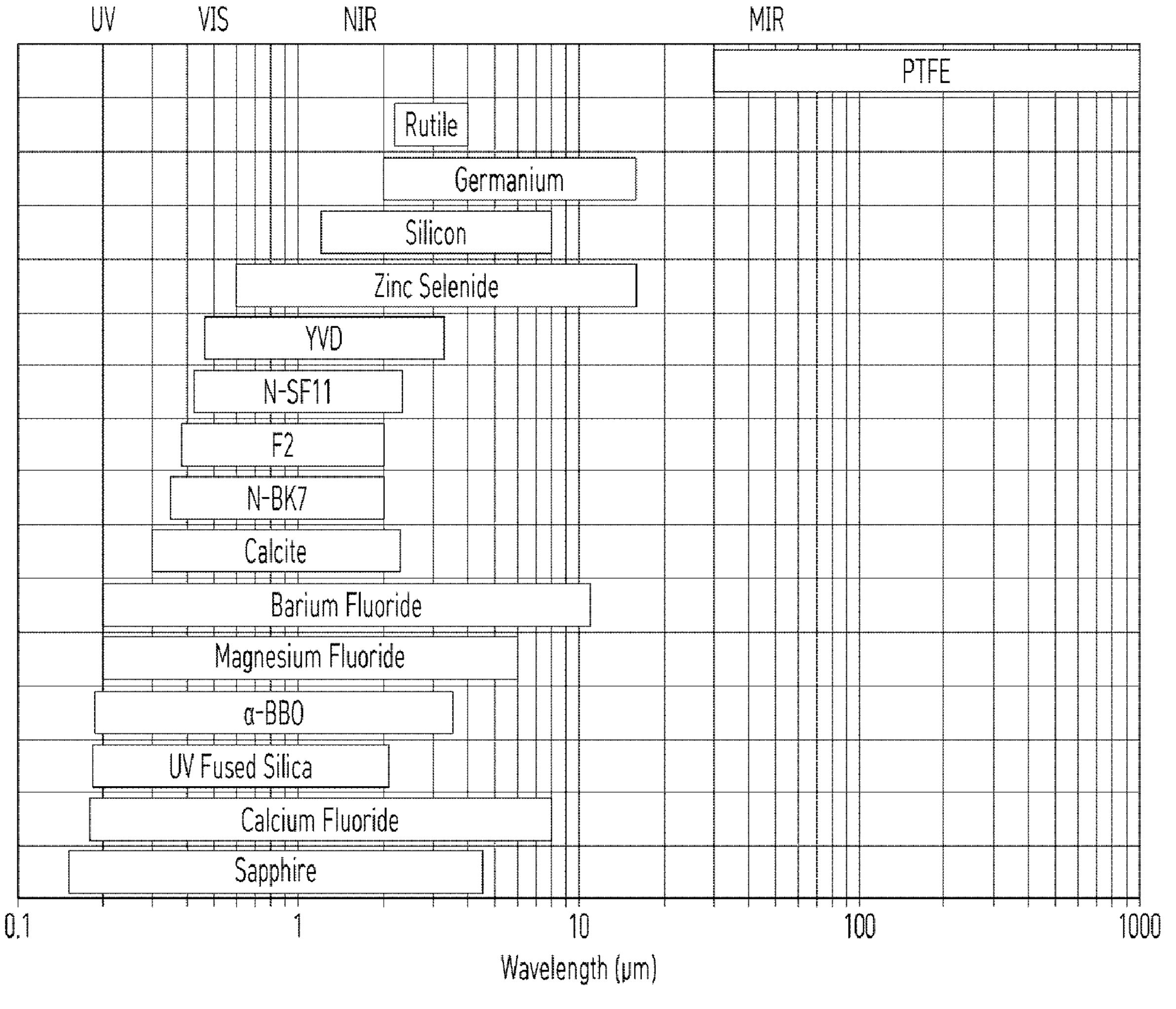

Referring to FIG. 7, the first reaction unit 140 or the second reaction unit 160 makes use of any one or more selected from ultraviolet light transmitting materials as shown to prevent the fluid therein from coming into direct contact with the reflector. For example, the ultraviolet light transmitting material of the first reaction unit 140 or the second reaction unit 160 may be at least one selected from sapphire, calcium fluoride, UV fused silica, alpha barium borate, magnesium fluoride, and barium fluoride.

As a result, the first reaction unit 140 or the second reaction unit 160 basically prevents materials harmful in health from leaking through unknown reactions between the fluid and the reflector or between the ultraviolet light and the reflector.

Figure 8:
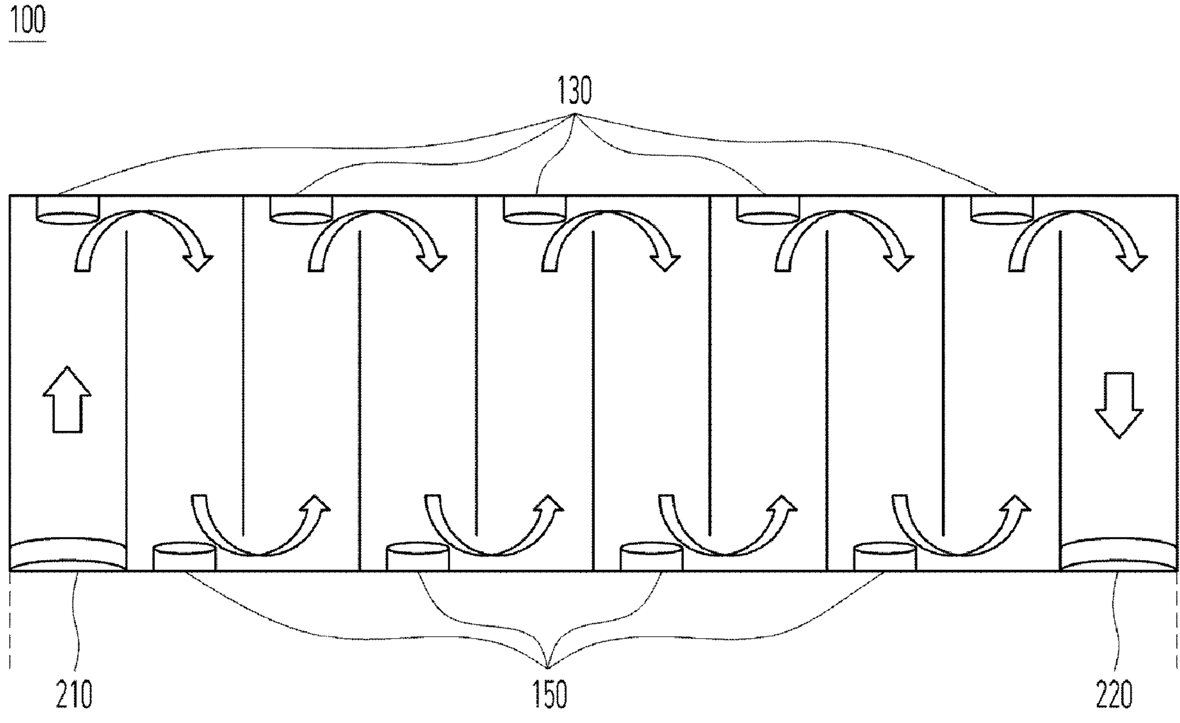
FIG. 8 is a sectional view showing an ultraviolet disinfection device according to a third embodiment of the present invention.

FIG. 8 is a sectional view showing an ultraviolet disinfection device according to a third embodiment of the present invention.

Referring to FIG. 8, an ultraviolet disinfection device 10 according to a third embodiment of the present invention includes a suction unit 210, first light source units 130, second light source units 150, and an exhaust unit 220.

The suction unit 210 is located on the underside of a chamber with one or more partition walls to suck a fluid like air to the interior of the chamber. In this case, the suction unit 210 has a photocatalytic filter adapted to prevent ultraviolet light from leaking to the outside of the chamber.

The first light source units 130 are disposed on top of the interior of the chamber, facing the suction unit 210, and thus irradiate first ultraviolet light onto the fluid introduced through the suction unit 210. For example, if the fluid is sucked to the interior of the chamber, the first light source units 130 receive power from an external power source and thus irradiate the first ultraviolet light.

The second light source units 150 are disposed on bottom of the interior of the chamber and thus irradiate second ultraviolet light onto the fluid passing through the first light source units 130 and the partition walls. For example, if the fluid is sucked to the interior of the chamber, the second light source units 150 receive power from the external power source and thus irradiate the second ultraviolet light.

The first light source units 130 and the second light source units 150 each include at least one or more UV-LEDs irradiating the first ultraviolet light and the second ultraviolet light, and in this case, the first light source units 130 and the second light source units 150 have channel type arrangements so that they irradiate the ultraviolet light onto the fluid passing through the partition walls of the interior of the chamber. As a result, the first light source units 130 and the second light source units 150 maximize an effective staying time during which the ultraviolet light and microorganisms in the fluid react to each other, thereby improving the disinfection effectiveness of the fluid.

The exhaust unit 220 is located on one side of the chamber to exhaust the fluid purified through the ultraviolet light. In this case, the exhaust unit 220 has a photocatalytic filter adapted to prevent ultraviolet light from leaking to the outside of the chamber.

Figure 9:
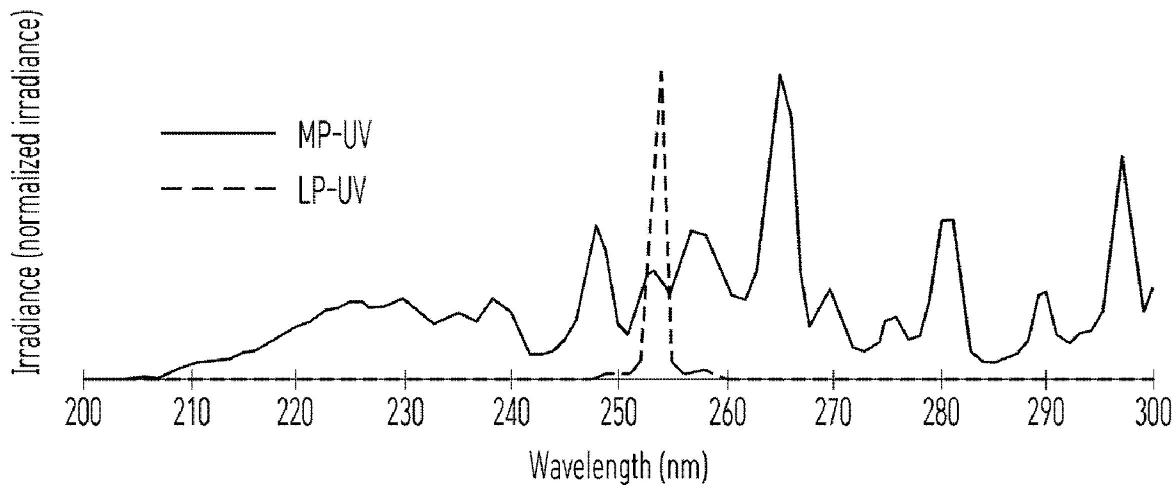
FIGS. 9 and 10 are views showing light source units of the ultraviolet disinfection device according to the first to third embodiments of the present invention.
Figure 10:
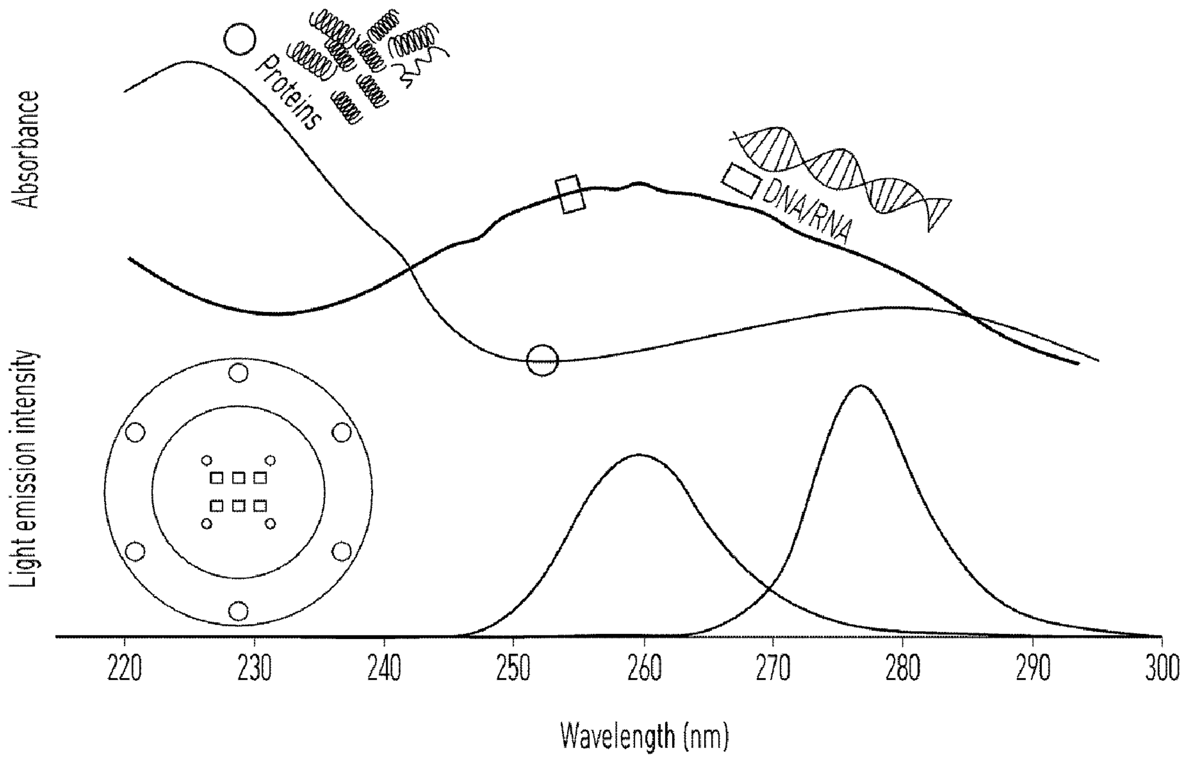

FIGS. 9 and 10 are views showing light source units of the ultraviolet disinfection device according to the first to third embodiments of the present invention. Referring to FIG. 9, it is appreciated that there is a close correlation between ultraviolet absorbing characteristics and inerting efficiency of microorganisms. If existing low pressure (LP)-UV is used as a light source, only the ultraviolet light with the wavelength of 254 nm is used for the disinfection, thereby causing low disinfection effectiveness due to the limitation of an area disinfected, and contrarily, if medium pressure (MP)-UV is used as a light source, ultraviolet light with the wavelengths not contributing to the disinfection may be emitted, thereby causing the energy unnecessarily consumed.

Accordingly, as shown in FIG. 10, the first light source units 130 and the second light source units 150 make use of the ultraviolet light having the maximum light energy absorbance peaks at the wavelengths of 265±5 nm and 278±7 nm to thus attack all of DNA, RNA and proteins of the microorganisms existing in the fluid, thereby obtaining maximum disinfection effectiveness.

Figure 11:
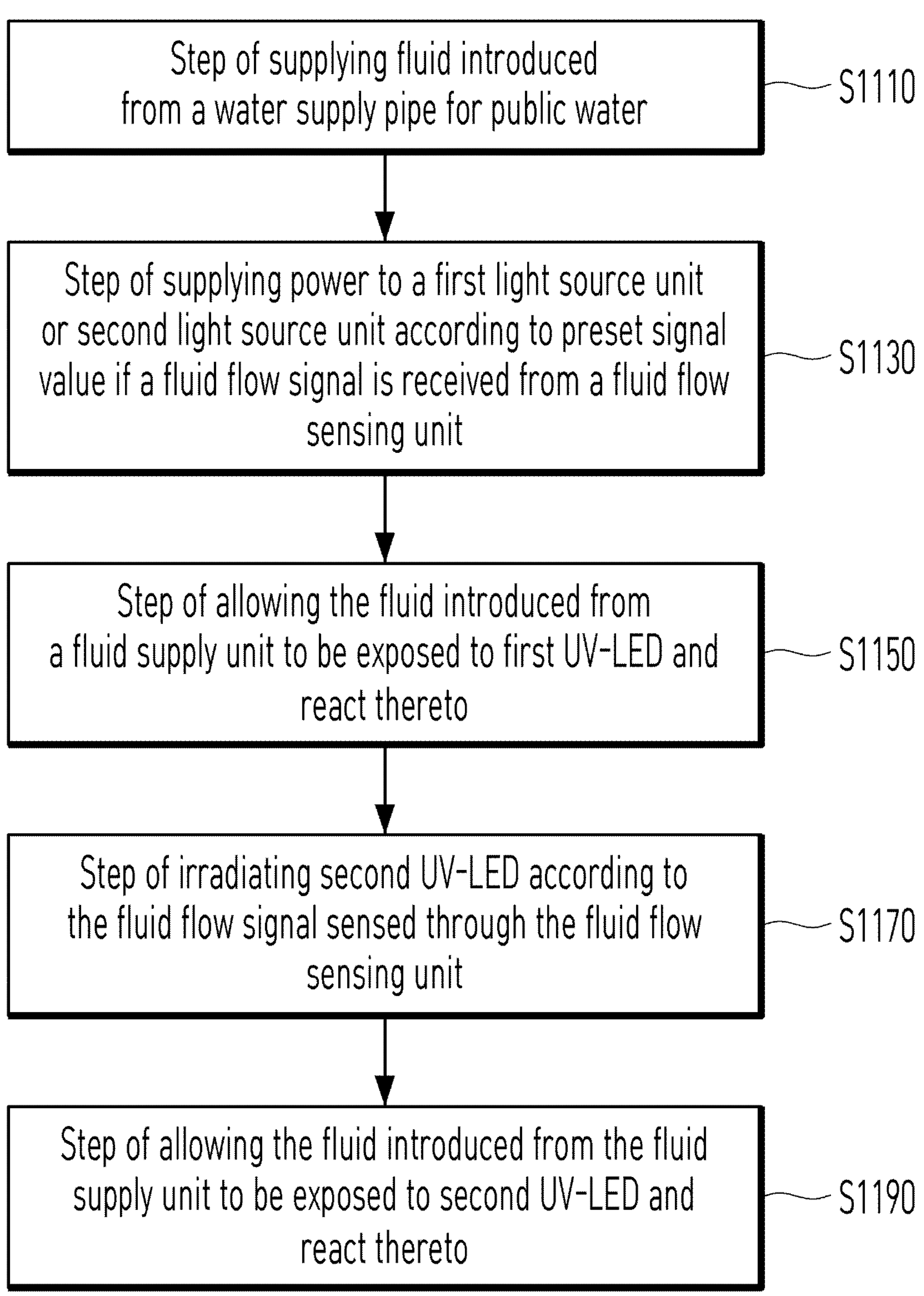
FIG. 11 is a flowchart showing an ultraviolet disinfection method according to a first embodiment of the present invention.

FIG. 11 shows an ultraviolet disinfection method according to a first embodiment of the present invention.

FIG. 11 is a flowchart showing the ultraviolet disinfection method according to the first embodiment of the present invention.

Referring to FIG. 11, at step S1110, the ultraviolet disinfection device 10 allows the fluid supply unit 110 to supply to the first reaction unit 140 a fluid introduced from a water supply pipe for public water, a storage tank for indoor or outdoor water, etc.

At step S1130, if the ultraviolet disinfection device 10 allows the power unit 120 to receive a fluid flow signal from the fluid flow sensing unit, the power unit 120 supplies power to the first light source unit 130 or the second light source unit 150 according to preset signal values.

At step S1150, the ultraviolet disinfection device 10 allows the first light source unit 130 to receive the power from the power unit 120 according to the fluid flow signal sensed through the fluid flow sensing unit and thus irradiate the first ultraviolet light. In this case, the first light source unit 130 of the ultraviolet disinfection device 10 is located on the inner peripheral surface of the first reaction unit 140 to irradiate the first ultraviolet light onto the fluid introduced into the first reaction unit 140 through the fluid supply unit 110.

If the first light source unit 130 of the ultraviolet disinfection device 10 makes use of ultraviolet light with the wavelength less than or equal to 230 nm, most of the ultraviolet light is absorbed to water, which is not adequate for disinfection of drinking water. Therefore, the first light source unit 130 of the ultraviolet disinfection device 10 makes use of the ultraviolet light having a maximum wavelength peak of 265±5 nm.

At step S1170, the ultraviolet disinfection device 10 allows the second light source unit 150 to receive the power from the power unit 120 according to the fluid flow signal sensed through the fluid flow sensing unit and thus irradiate the second ultraviolet light.

In this case, the second light source unit 150 of the ultraviolet disinfection device 10 is located on the inner peripheral surface of the second reaction unit 160 to irradiate the second ultraviolet light onto the fluid introduced into the second reaction unit 160 through the first reaction unit 140. In this case, the second light source unit 150 of the ultraviolet disinfection device 10 makes use of the ultraviolet light having a maximum wavelength peak of 278±7 nm.

At step S1190, the ultraviolet disinfection device 10 allows the fluid introduced through the fluid inlets protruding from top thereof to be exposed to the ultraviolet light and thus react to the ultraviolet light.

Figure 12:
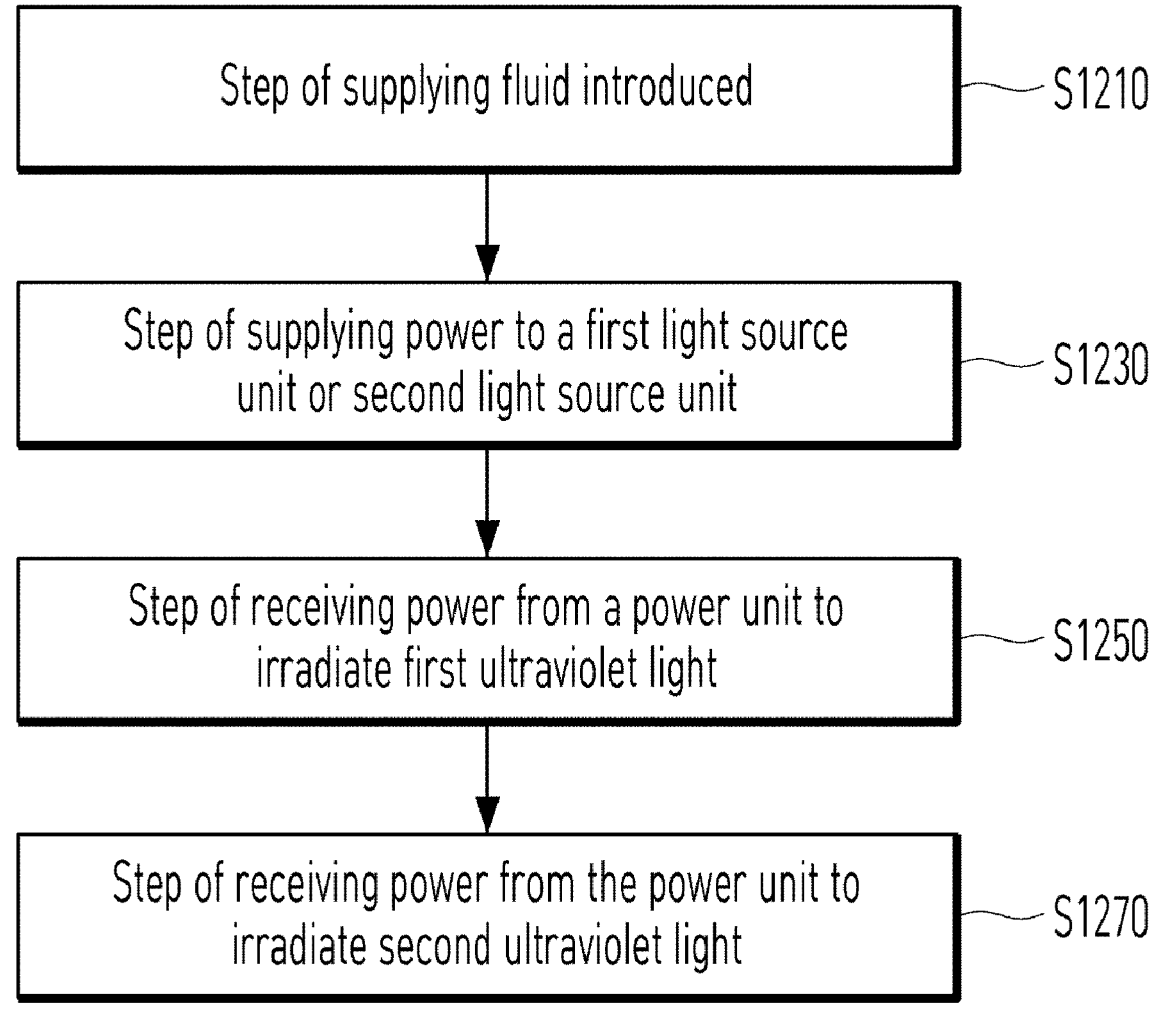
FIG. 12 is a flowchart showing an ultraviolet disinfection method according to a second embodiment of the present invention.

FIG. 12 is a flowchart showing an ultraviolet disinfection method according to a second embodiment of the present invention.

Referring to FIG. 12, at step S1210, the ultraviolet disinfection device 10 allows the fluid supply unit to supply to the first reaction unit 140 a fluid introduced from a water supply pipe for public water, a storage tank for indoor or outdoor water, etc.

At step S1230, the ultraviolet disinfection device 10 allows the power unit 120 to supply power to the first light source unit 130 or the second light source unit 150.

In this case, the ultraviolet disinfection device 10 has a fluid flow sensing unit disposed on one side of the first reaction unit 140 and/or the second reaction unit to sense the flow of the fluid, and if the power unit 120 of the ultraviolet disinfection device 10 receives a fluid flow signal from the fluid flow sensing unit, it supplies power to the first light source unit 130 or the second light source unit 150 according to preset signal values.

In this case, if a predetermined time has passed from the last time when the power unit 120 receives the fluid flow signal from the fluid flow sensing unit, the power unit 120 of the ultraviolet disinfection device 10 supplies power to the first light source unit 130 or the second light source unit 150 according to the preset signal values.

At step S1250, the ultraviolet disinfection device 10 allows the first light source unit 130 to receive the power from the power unit 120 and thus irradiate the first ultraviolet light. In this case, the first ultraviolet light has the wavelength of 260 to 270 nm. If the first light source unit 130 of the ultraviolet disinfection device 10 makes use of ultraviolet light with the wavelength less than or equal to 230 nm, most of the ultraviolet light is absorbed to water, which is not adequate for disinfection of drinking water. Therefore, the first light source unit 130 of the ultraviolet disinfection device 10 makes use of the ultraviolet light having a maximum wavelength peak of 265±5 nm.

At step S1270, the ultraviolet disinfection device 10 allows the second light source unit 150 to receive the power from the power unit 120 and thus irradiate the second ultraviolet light. In this case, the second ultraviolet light has the wavelength of 271 to 285 nm. The second light source unit 150 of the ultraviolet disinfection device 10 makes use of the ultraviolet light having a maximum wavelength peak of 278±7 nm.

Figure 13:
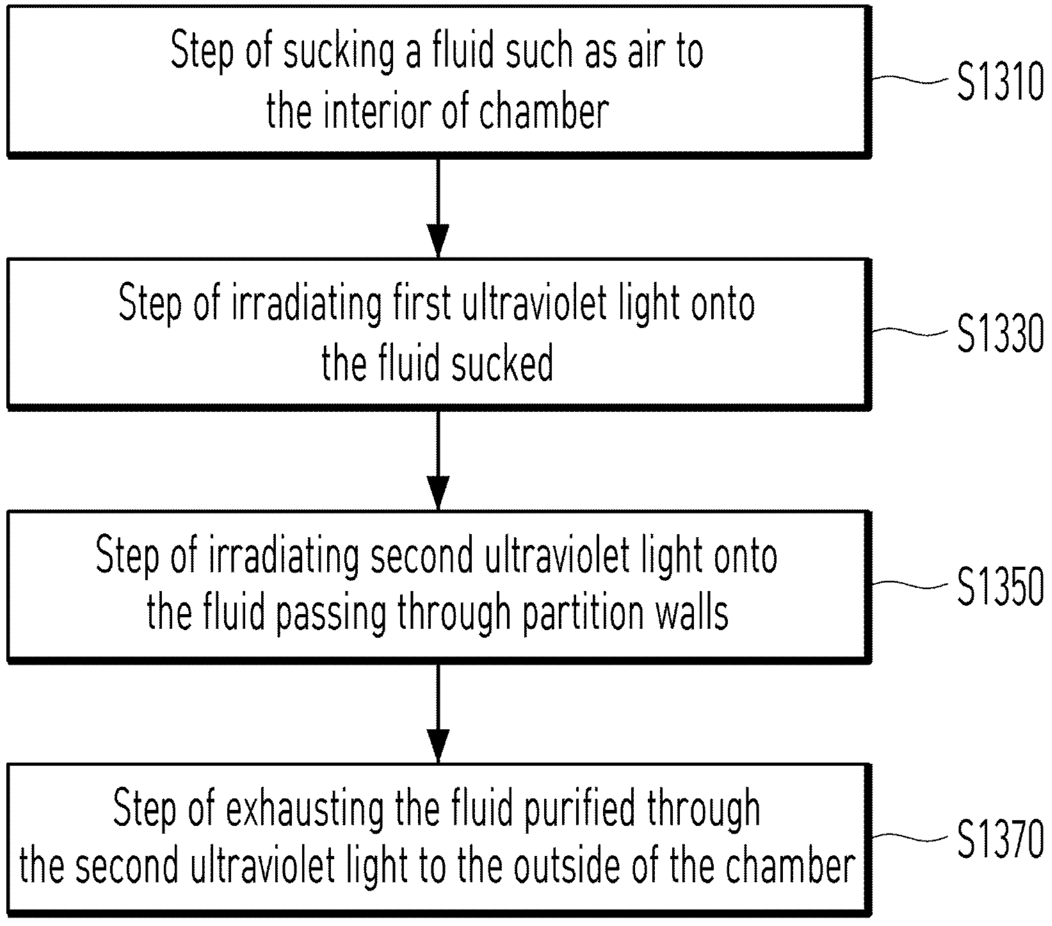
FIG. 13 is a flowchart showing an ultraviolet disinfection method according to a third embodiment of the present invention.

FIG. 13 is a flowchart showing an ultraviolet disinfection method according to a third embodiment of the present invention.

Referring to FIG. 13, at step S1310, the ultraviolet disinfection device 10 allows the suction unit 210 to suck a fluid like air to the interior of a chamber. In this case, the suction unit 210 of the ultraviolet disinfection device 10 has a photocatalytic filter adapted to prevent ultraviolet light from leaking to the outside of the chamber.

At step S1330, the ultraviolet disinfection device 10 allows the first light source units 130 to irradiate first ultraviolet light onto the fluid introduced through the suction unit 210. For example, if the fluid is sucked to the interior of the chamber, the first light source units 130 receive power from an external power source and thus irradiate the first ultraviolet light.

At step S1350, the ultraviolet disinfection device 10 allows the second light source units 150 disposed on bottom of the interior of the chamber to irradiate second ultraviolet light onto the fluid passing through the first light source units 130 and partition walls in the chamber. For example, if the fluid is sucked to the interior of the chamber, the second light source units 150 of the ultraviolet disinfection device 10 receive power from the external power source and thus irradiate the second ultraviolet light.

At step S1370, the ultraviolet disinfection device 10 allows the exhaust unit 220 located on one side of the chamber to exhaust the fluid purified through the ultraviolet light. In this case, the exhaust unit 220 of the ultraviolet disinfection device 10 has a photocatalytic filter adapted to prevent ultraviolet light from leaking to the outside of the chamber.

FIGS. 14 to 17 are views showing disinfection performance of the ultraviolet disinfection device according to the second embodiment of the present invention.

Figure 14:
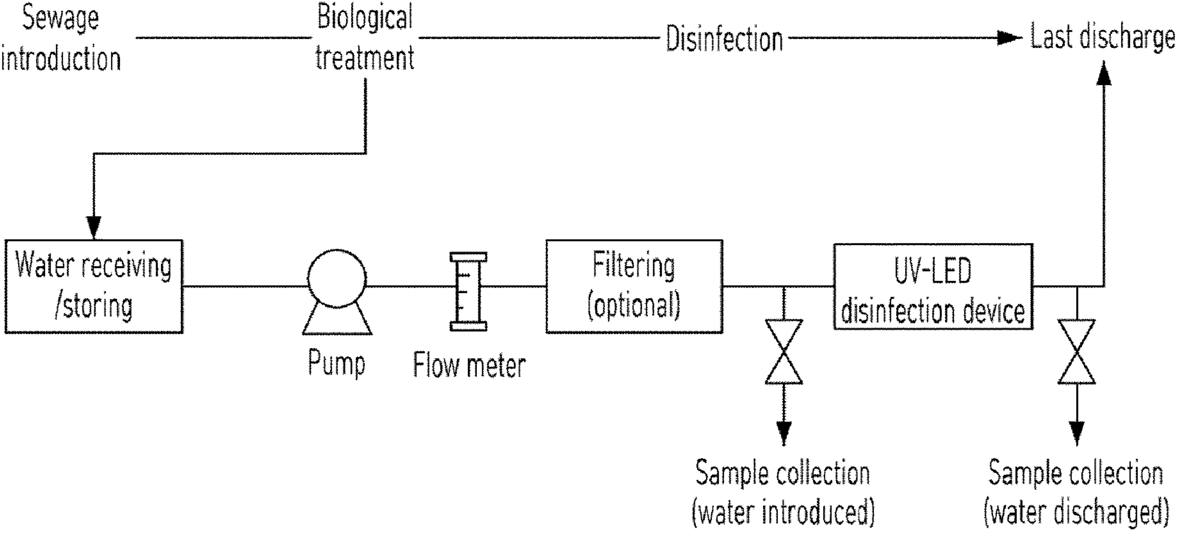
FIGS. 14 to 17 are views showing disinfection performance of the ultraviolet disinfection device according to the second embodiment of the present invention.

Referring to FIG. 14, biologically treated water discharged from a public sewage water treatment facility is conveyed to a storage facility and passes through a flow meter and a filtering device using a separate pump so as to comparedly estimate the disinfection performance of the ultraviolet disinfection device 10 according to the second embodiment of the present invention. After that, disinfection is conducted using the ultraviolet disinfection device 10 according to the second embodiment of the present invention and a device to which the existing disinfection method is applied, and water introduced and water discharged are collected at the front and rear stages of the respective devices to extract total coliforms therefrom. Lastly, the removal rates of the total coliforms are calculated.

Figure 15:
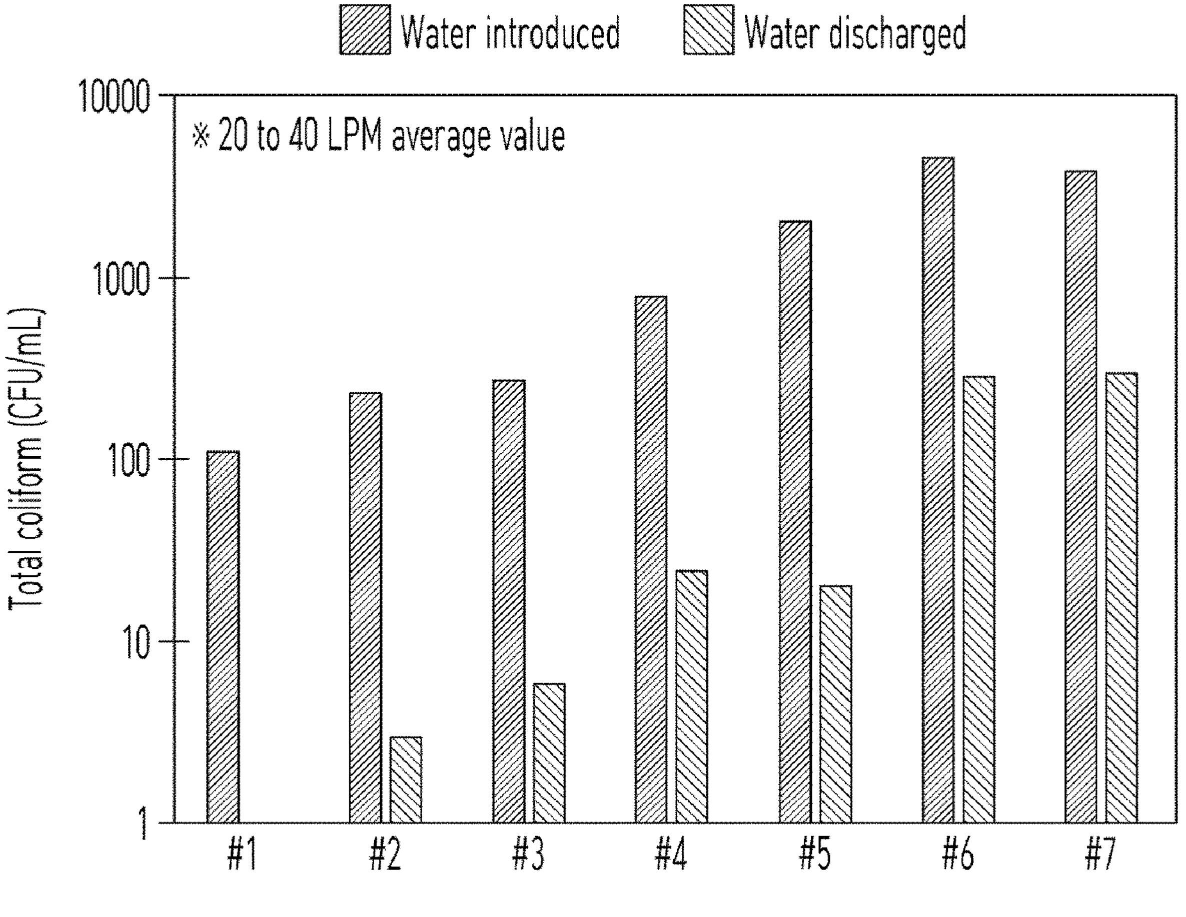
Figure 16:
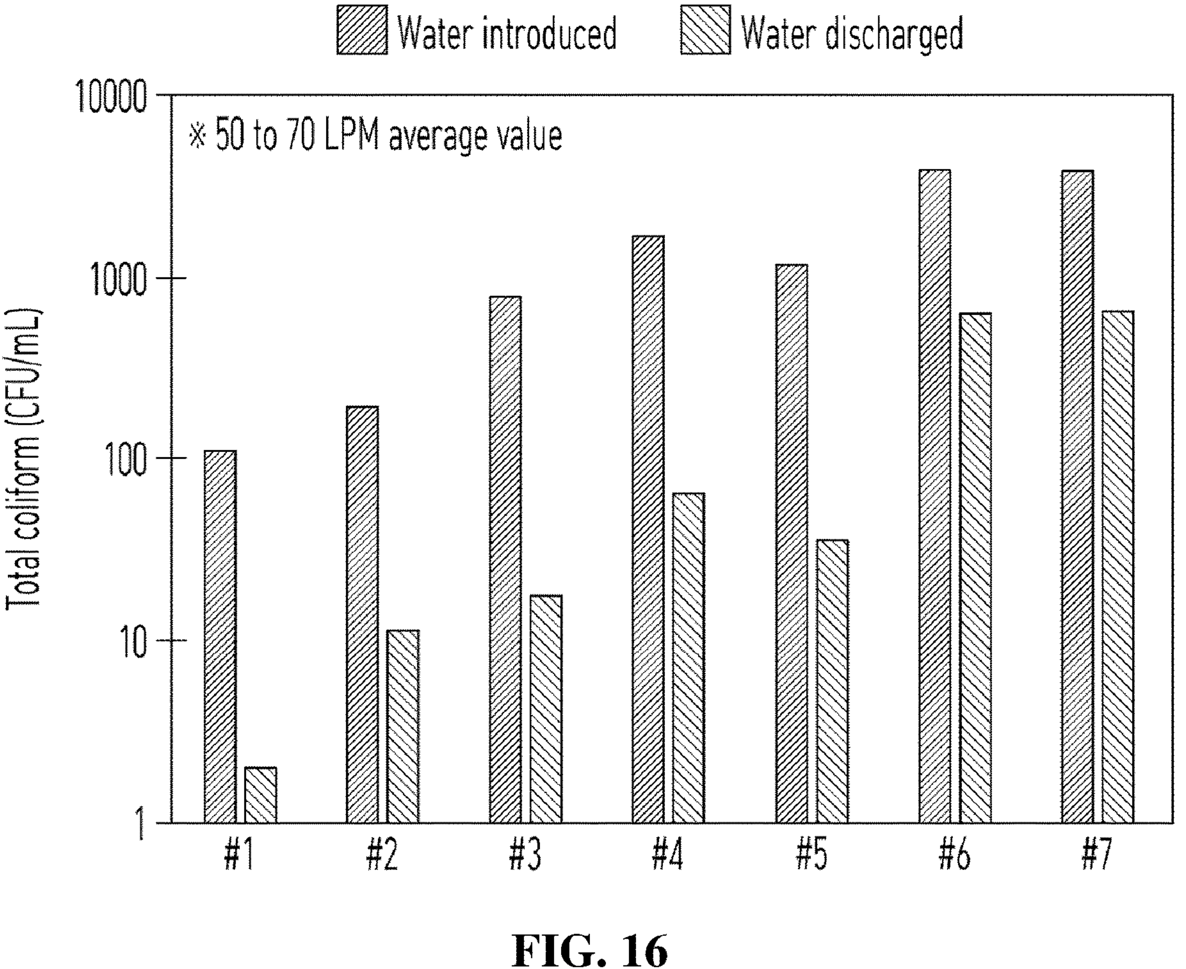

Referring to FIGS. 15 and 16, after the water introduced and water discharged were collected at the front and rear stages of the respective devices to extract total coliforms therefrom, it could be checked that total coliforms of the discharged water purified through the ultraviolet disinfection device 10 according to the second embodiment of the present invention was less than or equal to 500 CFU/mL in first to seventh tests (Nos. 1 to 7), which satisfies 1000 CFU/mL as a sewage water quality standard.

Figure 17:
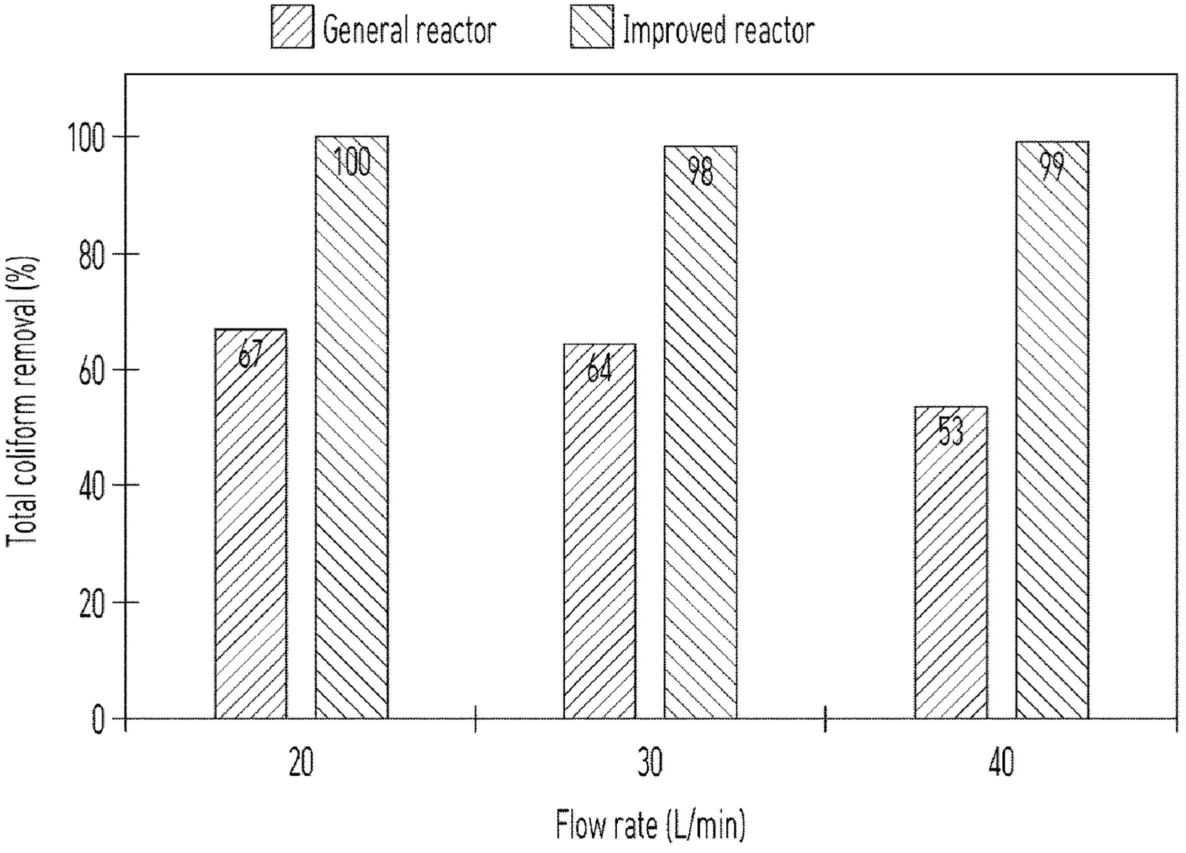

Referring to FIG. 17, after the water introduced and water discharged were collected at the front and rear stages of the ultraviolet disinfection device 10 and the device to which the existing disinfection method is applied to calculate the removal rates of the total coliforms, it could be checked that the removal rate of the total coliforms of the improved reactors of the ultraviolet disinfection device 10 was remarkably higher at all of flow rates (20, 30, and 40 L/min) than the general reactors of the device to which the existing disinfection method is applied. It can be therefore appreciated that the ultraviolet disinfection device 10 according to the present invention has excellent disinfection performance.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above teachings. It is therefore intended that the scope of the invention be limited not by this detailed description, but rather by the claims appended hereto. For example, the parts expressed in a singular form may be dispersedly provided, and in the same manner as above, the parts dispersed may be combined with each other.

Thus, although the invention has been described with respect to specific embodiments, it will be appreciated that the invention is intended to cover all modifications and equivalents within the scope of the following claims.

MODE FOR INVENTION

The mode for the present invention will be appreciated from the best mode for the present invention as explained above.

INDUSTRIAL APPLICABILITY

The present invention relates to the ultraviolet disinfection device that makes use of the ultraviolet chamber to prevent the user's body from being exposed to the light sources or the ultraviolet light irradiated from the light sources, thereby providing safe environments during the use.

The invention claimed is:

1. An ultraviolet disinfection device, comprising:

a fluid supply unit configured to supply a fluid;

a fluid flow sensing unit configured to sense a flow of the fluid;

a power unit configured to supply power when a fluid flow signal is received from the fluid flow sensing unit;

a first reaction unit having a sealed space and configured such that an interior thereof is maintained in a fully filled state with the fluid, the first reaction unit being configured to receive the fluid supplied from the fluid supply unit through a fluid inlet disposed at a lower portion of one side thereof and to discharge the fluid through a fluid outlet disposed at an upper portion of an opposite side thereof;

a first light source unit disposed on the opposite side of the first reaction unit, the first light source unit being configured to receive the power from the power unit and to irradiate a first ultraviolet light in a direction opposite to a flow direction of the fluid inside the first reaction unit;

a second reaction unit configured to receive the fluid discharged from the first reaction unit through a fluid inlet disposed at an upper portion of one side thereof and to discharge the fluid through a fluid outlet disposed at a lower portion of an opposite side thereof; and a second light source unit disposed on one side of the second reaction unit and configured to irradiate a second ultraviolet light in a direction opposite to a flow direction of the fluid inside the second reaction unit, wherein the fluid passes through the first reaction unit and the second reaction unit while each reaction unit remains in the fully filled state, wherein the fluid flow sensing unit is disposed in a passage connecting the first reaction unit and the second reaction unit and is configured to sense the flow of the fluid, and wherein the power unit is configured to supply the power to the first light source unit or the second light source unit according to a preset signal value when a preset time has elapsed following receipt of a last fluid flow signal.

2. The ultraviolet disinfection device according to claim 1, further comprising an outer cover surrounding the first reaction unit and having a reflector configured to reflect the second ultraviolet light, or an outer cover surrounding the second reaction unit and having a reflector configured to reflect the first ultraviolet light.

3. The ultraviolet disinfection device according to claim 1, wherein the first reaction unit is made of an ultraviolet transmitting material or the second reaction unit is made of an ultraviolet transmitting material.

4. The ultraviolet disinfection device according to claim 1, wherein an outer wall of the second reaction unit is coated with a reflector configured to reflect the first ultraviolet light irradiated from the first light source unit, or an outer wall of the first reaction unit is coated with a reflector configured to reflect the second ultraviolet light irradiated from the second light source unit.

5. The ultraviolet disinfection device according to claim 1, wherein the first light source unit and the second light source unit irradiate the first and second ultraviolet light having different maximum wavelength peaks.

6. An ultraviolet disinfection device, comprising:

a fluid supply unit configured to supply a fluid;

a fluid flow sensing unit configured to sense a flow of the fluid;

a power unit configured to supply power when a fluid flow signal is received from the fluid flow sensing unit;

a first housing having one end closed;

a first reaction unit disposed in a cylindrical shape inside the first housing and configured such that the fluid supplied from the fluid supply unit is introduced through a fluid inlet located at a lower portion of one side thereof and discharged through an open end thereof;

a first light source unit disposed outside the first housing and positioned adjacent to the open end of the first reaction unit, the first light source unit being configured to receive the power from the power unit and to irradiate a first ultraviolet light in a direction opposite to a flow direction of the fluid;

a connector having a cylindrical shape and communicating with the open end of the first reaction unit so as to allow the fluid discharged from the first reaction unit to pass therethrough;

a second housing having one end closed and having a second reaction unit;

the second reaction unit coupled to the connector so that the fluid discharged from the first reaction unit is introduced therein and discharged through an open end thereof; and a second light source unit disposed outside the second housing and positioned adjacent to the open end of the second reaction unit, the second light source unit being configured to receive the power from the power unit and to irradiate a second ultraviolet light in a direction opposite to a flow direction of the fluid, wherein the fluid flow sensing unit is disposed on one side of the connector to sense the flow of the fluid, and wherein the power unit is configured to supply the power to the first light source unit or the second light source unit according to a preset signal value when a preset time has elapsed following receipt of a last fluid flow signal.

7. An ultraviolet disinfection method, comprising:

supplying a fluid introduced through a water supply pipe;

sensing a flow of the fluid to generate a fluid flow signal;

supplying power when the fluid flow signal is received; and irradiating at least one of first ultraviolet light and second ultraviolet light in a direction opposite to a flow direction of the fluid using the power supplied, wherein the supplying power further comprises supplying the power to irradiate the first ultraviolet light or the second ultraviolet light according to a preset signal value when a preset time has elapsed following receipt of a last fluid flow signal.

* * * * *